(12) United States Patent
Schreier et al.

(10) Patent No.: US 8,578,364 B2
(45) Date of Patent: Nov. 5, 2013

(54) DYNAMIC MANAGEMENT OF OPERATING SYSTEM RESOURCES

(75) Inventors: Steffen Schreier, Duvall, WA (US); Oren Winter, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 12/109,524

(22) Filed: Apr. 25, 2008

(65) Prior Publication Data

US 2009/0271776 A1     Oct. 29, 2009

(51) Int. Cl.
  *G06F 9/50* (2006.01)
  *G06F 9/44* (2006.01)

(52) U.S. Cl.
  USPC ............ 717/170; 715/788; 707/821; 718/104

(58) Field of Classification Search
  USPC .......................................................... 717/170
  See application file for complete search history.

(56) References Cited

U.S. PATENT DOCUMENTS

| | | | | |
|---|---|---|---|---|
| 5,541,987 A * | 7/1996 | Topper et al. | ................. | 379/230 |
| 5,794,253 A * | 8/1998 | Norin et al. | ............................ | 1/1 |
| 5,838,968 A | 11/1998 | Culbert | | |
| 5,946,677 A * | 8/1999 | Bullen | ........................... | 707/700 |
| 6,324,550 B1 | 11/2001 | Huetter | | |
| 6,591,418 B2 * | 7/2003 | Bryan et al. | .................. | 717/177 |
| 6,640,203 B2 * | 10/2003 | Brown et al. | .................. | 702/186 |
| 6,732,359 B1 * | 5/2004 | Kirkpatrick et al. | ........... | 718/102 |
| 6,789,215 B1 | 9/2004 | Rupp et al. | | |
| 6,850,257 B1 * | 2/2005 | Colleran et al. | ............... | 715/804 |
| 6,948,166 B2 | 9/2005 | Barfield et al. | | |
| 7,028,305 B2 | 4/2006 | Schaefer | | |
| 7,185,335 B2 | 2/2007 | Hind et al. | | |
| 7,206,975 B1 * | 4/2007 | Wilding | ........................ | 714/47.1 |
| 7,360,042 B2 * | 4/2008 | Chen et al. | .................... | 711/159 |
| 7,373,398 B2 * | 5/2008 | McIlroy | ........................ | 709/221 |
| 7,467,126 B2 * | 12/2008 | Smith et al. | ........................... | 1/1 |
| 7,712,099 B2 * | 5/2010 | Vargas et al. | .................. | 718/102 |
| 7,996,721 B2 * | 8/2011 | Zhou | ............................. | 714/38.1 |
| 2003/0084096 A1 * | 5/2003 | Starbuck et al. | ............. | 709/203 |
| 2003/0208520 A1 * | 11/2003 | Hewitt | .......................... | 709/102 |
| 2005/0027954 A1 * | 2/2005 | Rothman et al. | ............. | 711/159 |
| 2006/0036735 A1 | 2/2006 | Gasca et al. | | |
| 2007/0101338 A1 * | 5/2007 | Heddaya et al. | ............. | 718/104 |
| 2007/0220321 A1 | 9/2007 | Iqbal et al. | | |
| 2009/0106518 A1 * | 4/2009 | Dow | ............................. | 711/165 |

OTHER PUBLICATIONS

System Restore 2004.*
WinXPTutor 2006.*
"MemoryUp User Manual Mobile Ram Booster for BlackBerry", eMobiStudio Inc., pp. 1-12.
"HP-UX Linker and Libraries User's Guide", Nov. 1997, Hewlett-Packard Company, 1997, pp. 1-333.

* cited by examiner

*Primary Examiner* — Don Wong
*Assistant Examiner* — Theodore Hebert
(74) *Attorney, Agent, or Firm* — Alleman Hall McCoy Russell & Tuttle LLP

(57) ABSTRACT

A method for dynamically managing operating system resources of a computing device. Each of the operating system resources have one or more data elements. The method includes: at an observer module of the operating system, monitoring stability and/or usage of the one or more data elements of each of the operating system resources, selecting an unused and/or unstable operating system resource data element; and removing a selected operating system resource data element.

18 Claims, 4 Drawing Sheets

DYNAMIC MANAGEMENT OF OPERATING SYSTEM RESOURCES

BACKGROUND

Memory and/or processing resources of a computer may be used to perform computing operations. An operating system of the computer may consume at least some memory and/or processing resources, thus limiting the memory and/or processing resources available to perform computing operations. One approach to control the amount of memory and processing resources used by the operating system includes, during installation of the operating system on the computer, not installing operating system resources that are deemed to be unused or unwanted on the computer.

However, over time as the computer is used, the type and amount of memory and processing resources associated with the operating system and/or the memory and processing footprint of the operating system may grow due to updates, backups, unused resources, and other process resources being added to the operating system. This can sometimes result in decreased performance of the computer.

SUMMARY

A method for dynamically managing operating system resources of a computing device is provided. Each of the operating system resources includes one or more data elements. The method comprises: at an observer module of the operating system, monitoring stability and/or usage of the one or more data elements of each of the operating system resources, selecting an unused and/or unstable operating system resource data element, and removing a selected operating system resource data element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to monitoring of operating system resources and operations of a computing system. More particularly, operating system resources may be dynamically monitored by an observer module, which may be a component of the operating system, a stand-alone application, etc. The observer module may be configured to selectively remove an operating system resource based on a variety of factors. As a non-limiting example, an operating system resource may be removed based on a usage factor. By removing an operating system resource based on one or more usage factors, unused operating system resources may be dynamically removed throughout operation of the computing system. As another non-limiting example, an operating system resource may be removed based on one or more stability factors. By removing an operating system resource based on the effect that the operating system resource has on the stability of the computing system, removal of operating system resources may be performed in a robust manner so that operation of the computing system may be improved. Accordingly, the amount of memory and/or processing resources used by the operating system may be reduced, thus freeing up memory and/or processing resources for allocation to other computing operations.

Figure 1:
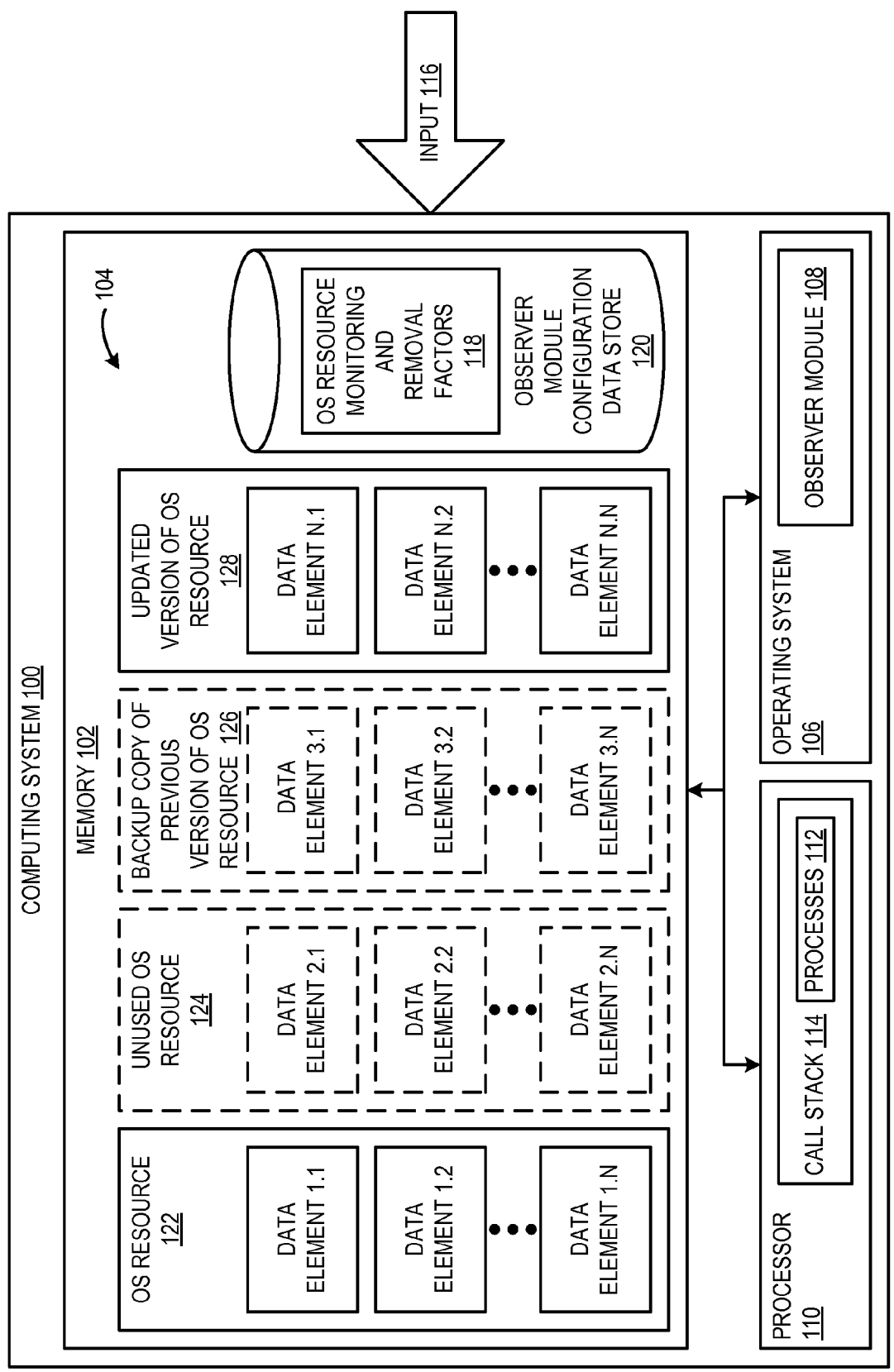
FIG. 1 is a schematic view of a computing system on which resources of an operating system of the computing system may be dynamically managed.

FIG. 1 schematically shows an example computing system 100 in which resources may be dynamically monitored and intelligently removed. Computing system 100 may include an operating system 106 that is configured to manage a plurality of operating system (OS) resources 104 stored in memory 102 of the computing system. It will be appreciated that memory 102 may include virtually any suitable type of memory, such as volatile or non-volatile memory, for example. In one example, the volatile memory may include random access memory (RAM) and the non-volatile memory may include a hard drive or other mass storage device.

Computing system 100 may include a processor 110 configured to execute one or more of processes 112 that are organized according to a call stack 114. Call stack 114 may be organized by operating system 106. During execution of a process, the process may request use of one or more of the plurality of OS resources, and the operating system may facilitate access to the OS resource(s). More particularly, a process may request use of one or more data elements of an OS resource and the operating system may facilitate access to the data element(s) of the OS resource. Further, the operating system may organize allocation of the processor and/or OS resources to one or more of the processes in a call stack based on system data and/or user input.

An OS resource may be a file of virtually any suitable file type. For example, an OS resource may be a binary file. As a particular example, the binary file may be a dynamically linked library (.DLL) file. Each of the plurality of operating system resources may include one or more data elements. A data element may include virtually any suitable type of data. For example, a data element may include an application programming interface (API) by which programs communicate with the OS resource. Further, in some cases, an OS resource may include a plurality of APIs as well as other data elements.

Operating system 106 may include an operating system observer module 108 for dynamically monitoring OS resources. In particular, observer module 108 may monitor each data element of each of the OS resources. Observer module 108 may dynamically monitor and selectively remove a data element of an OS resource based on one or more OS resource monitoring and removal factors 118 stored in observer module configuration data store 120 of memory 102. While in the depicted embodiment the observer module 108 is illustrated as a component of the operating system 106, it will be appreciated that the observer module may alternatively be implemented via an application program executed on the computing system 100.

Observer module 108 may be configured to monitor OS resource data elements at various levels and/or locations of computing system 100 based on OS resource monitoring and removal factors 118. For example, observer module 108 may monitor OS resource data elements at a memory access level. As another example observer module 108 may monitor OS resource data elements at a processes level. As yet another example observer module 108 may monitor OS resource data elements at a call stack level.

OS resource monitoring and removal factors 118 may be used to determine what OS resource data elements are to be selected for removal from the computing system. In one example, OS resource data elements are monitored for selection based on usage (including a lack of usage) of the OS resource data elements. Further, the OS resource monitoring and removal factors may include usage thresholds used to determine selection of an OS resource data element for removal. For example, a usage threshold may be set for an elapsed period since last use of the data element, a number of times the data element has been used over a predetermined period, etc. As another example, a usage threshold may be set for a number of events that have occurred since last use of the data element. As a particular example, an event may include a threshold number of computing system reboots. This may be used, for example, to determine whether a computer was rebooted multiple times following use of an OS resource, making the OS resource an appropriate target for removal. As yet another example, a usage threshold may be set that is based on the number of computing states that have occurred since last use of the data element. The computing states, for example, may be error states detected by the operating system, and may be used to target error-prone resources for removal.

Continuing with FIG. 1, observer module 108 may be configured to monitor the OS resource data elements based on OS resource monitoring and removal factors that include usage of the OS resources. Computing system 100 includes OS resource 122 having data elements 1.1-1.N and unused OS resource 124 having data elements 2.1-2.N saved in memory 102. Observer module 108 determines that data elements 1.1-1.N of OS resource 122 have been used recently relative to a predetermined usage threshold, so observer module 108 does not select OS resource 122 and data elements 1.1-1.N for removal. In contrast, observer module 108 determines that data elements 2.1-2.N of unused OS resource 124 have not been used recently relative to a predetermined usage threshold, so observer module 108 selects unused OS resource 124 for removal since all data elements of the OS resource do not meet the usage threshold, as indicated by the dashed lines. It will be appreciated that the observer module monitors OS resources on a data element level, and thus individual data elements of an OS resource may be selected for removal without removing the entire OS resource.

As another example, an OS resource may be removed based on the effect that the OS resource has on stability of the computing system. Further, the OS resource monitoring and removal factors may include stability thresholds used to determine selection of an OS resource data element for removal. For example, a stability threshold may be set for an elapsed run-time period after installation of the data element. As another example, a stability threshold may be set to a number of operating system reboot cycles after installation of the data element. As yet another example, a stability threshold may include a system performance benchmark that may be achieved after installation of the data element. It will be appreciated that other factors may be used to select an OS resource data element for removal without departing from the scope of the present disclosure. In some cases, multiple factors may be used to select an OS resource data element for removal, such as usage and stability factors, for example.

Continuing with FIG. 1, observer module 108 is configured to monitor the OS resource data elements based on OS resource monitoring and removal factors that include the effect that the OS resources have on stability of the computing system. Computing system 100 may include an updated version of an OS resource 128 having data elements N.1-N.N and a backup copy of a previous version of OS resource 126 having data elements 3.1-3.N. Observer module 108 is configured to determine that computing system 100 is stable for a predetermined stability threshold after installation of data elements N.1-N.N of updated version of OS resource 128, and as a result observer module 108 is configured to select a backup copy of a previous version of OS resource 126 and data elements 3.1-3.N for removal, as indicated by dashed lines.

In some embodiments, a selected data element may be selectively removed based on at least one operating parameter of the data element. For example, a data element operating parameter may include a size of a data element. In one example, a data element may be removed because the size of the data element is above a predetermined threshold size, indicating that the data element uses more resources and is a suitable candidate for removal. As another example, a data element operating parameter may include a frequency of past use of the selected data element. In one example, a data element may be removed because the data element is not used frequently relative to a predetermined frequency threshold. It will be appreciated that other operating parameters and thresholds may be used to determine selective removal of a selected data element. Further, it will be appreciated that the operating parameters and thresholds used to determine selective removal of a data element may be included in the OS resource monitoring and removal factors stored in the observation module configuration data store.

Similarly, in some embodiments, some OS resource monitoring and removal factors 118 may specify that a data element is precluded from being removed from memory 102. For example, a selected data element may not be removed based on the selected data element being accessed during a predetermined state of operation. In one particular example, the state of operation includes a state during which the operating system performs computing system boot-up operations. In another example, a user or administrator may specify that certain OS resources are precluded from removal, and this preference may be saved in the OS resource monitoring and removal factors 118. It will be appreciated that other operating parameters and thresholds may be used to preclude removal of a selected data element.

It will be appreciated that OS monitoring and removal factors 118 may be provided in virtually any suitable manner. For example, the OS monitoring and removal factors may be provided upon initiation of the operating system. As another example, the OS monitoring and removal factors may be provided by input 116. In one particular example, the input is user input, and thus at least some of the OS monitoring and removal factors may be user generated. In another particular example, the input is an updated version of an OS resource, and the OS monitoring and removal factors are provided upon installation of the updated version of an OS resource. In some cases, the updated version of the OS resource is received from a remote source via the input.

Figure 2:
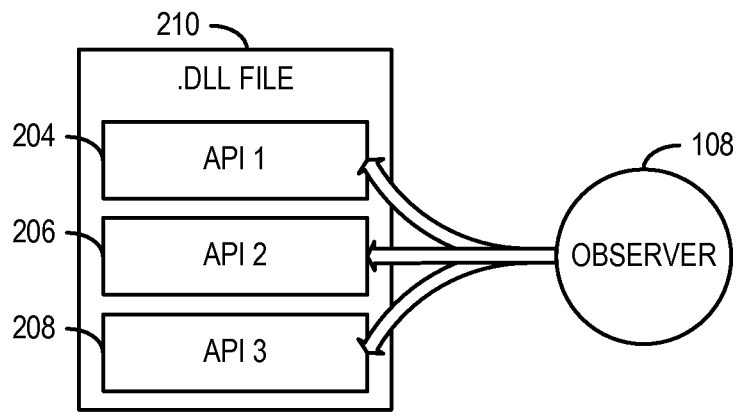
FIG. 2 is a schematic view illustrating an observer module of the operating system of FIG. 1, engaged in monitoring APIs (application programming interfaces) of a .DLL (dynamically linked library) file.
Figure 3:
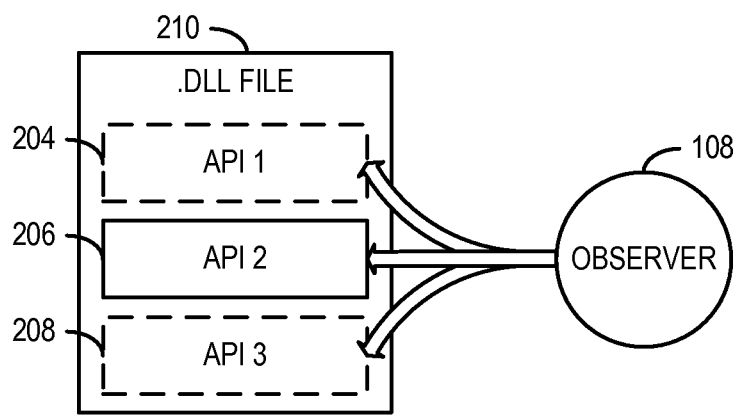
FIG. 3 is a schematic view illustrating the observer module of FIG. 2 selecting unused APIs for removal.
Figure 4:
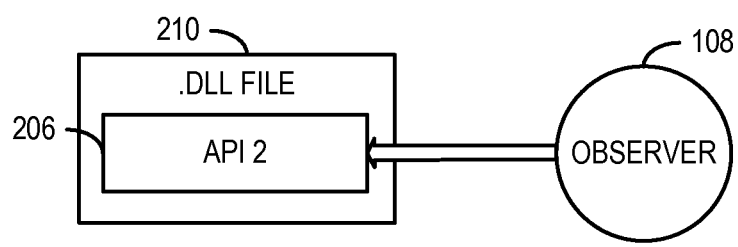
FIG. 4 is a schematic view illustrating the observer module removing the APIs selected in FIG. 3.
Figure 5:
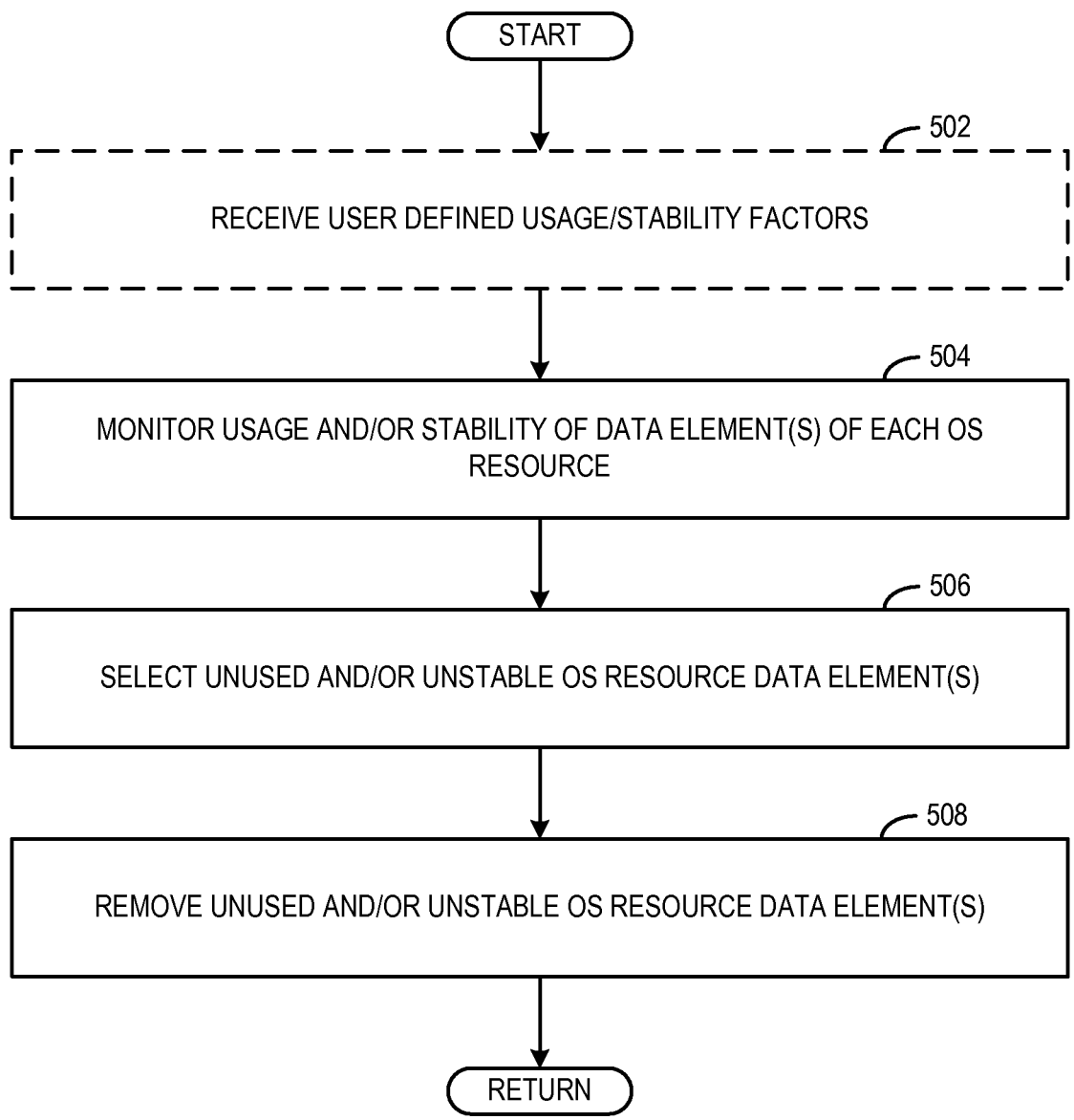
FIG. 5 is a flowchart of an embodiment of a method of dynamically managing operating system resources based on usage and/or stability of the operating system resources.

FIGS. 3-5 schematically show an example of an observer module dynamically monitoring usage of data elements (e.g., APIs) of an OS resource (e.g., .DLL file), selecting data elements based on detection of an elapsed threshold period since last use of the data elements, and removing the selected data elements. At FIG. 2, observer module 108 monitors usage of a first API 204, a second API 206, and a third API 208 of a .DLL file 210. As discussed above, the observer module may monitor usage of a data element by examining the call stack and currently running processes for the data elements, as well as memory access of the data elements. At FIG. 3, observer module 108 selects first API 204 and third API 208 for removal based on the data elements not meeting usage thresholds that are predetermined by usage factors of the observer module. At FIG. 4, the first and third APIs are removed, resulting in .DLL file 210 only including second API 206 which is monitored by observer module 108. In one example, removing the data elements from the OS resource includes deleting the data elements from memory of the computing system.

FIG. 5 shows a process flow of an example method of dynamically managing operating system resources based on usage and/or stability of the operating system resources. In some embodiments, the method may be performed at an observer module of the operating system. The method may include, at 502, receiving user defined usage and/or stability factors. The usage and/or stability factors may be received via user input to the computing system. Alternatively or in addition, the usage and/or stability factors may be predefined by the operating system and/or an OS resource.

Next at 504, the method may include monitoring usage and/or stability of data element(s) of each OS resource. For example, monitoring of a data element may be conducted at the call stack level, the running processes level, and/or the memory access level.

Next at 506, the method may include selecting an unused and/or unstable OS resource data element(s). A data element may be selected based on one or more removal factors that include predetermined thresholds, as discussed above. In some embodiments, the method may include selecting an OS resource data element based on a user input defined factor and/or threshold, as also discussed above.

Next at 508, the method may include removing an OS resource data element(s) selected as being unused and/or unstable. In an example where all data elements of a particular OS resource are selected as being unused and/or unstable, the method may include selecting and removing the entire OS resource including all data elements of the OS resource.

By dynamically removing unused data elements of OS resources from the computing system, the memory and/or processing footprint of the operating system may be reduced throughout operation of the computing system. Accordingly, the operating performance of the computing system may be improved since the availability of memory and processing resources may be increased.

Figure 6:
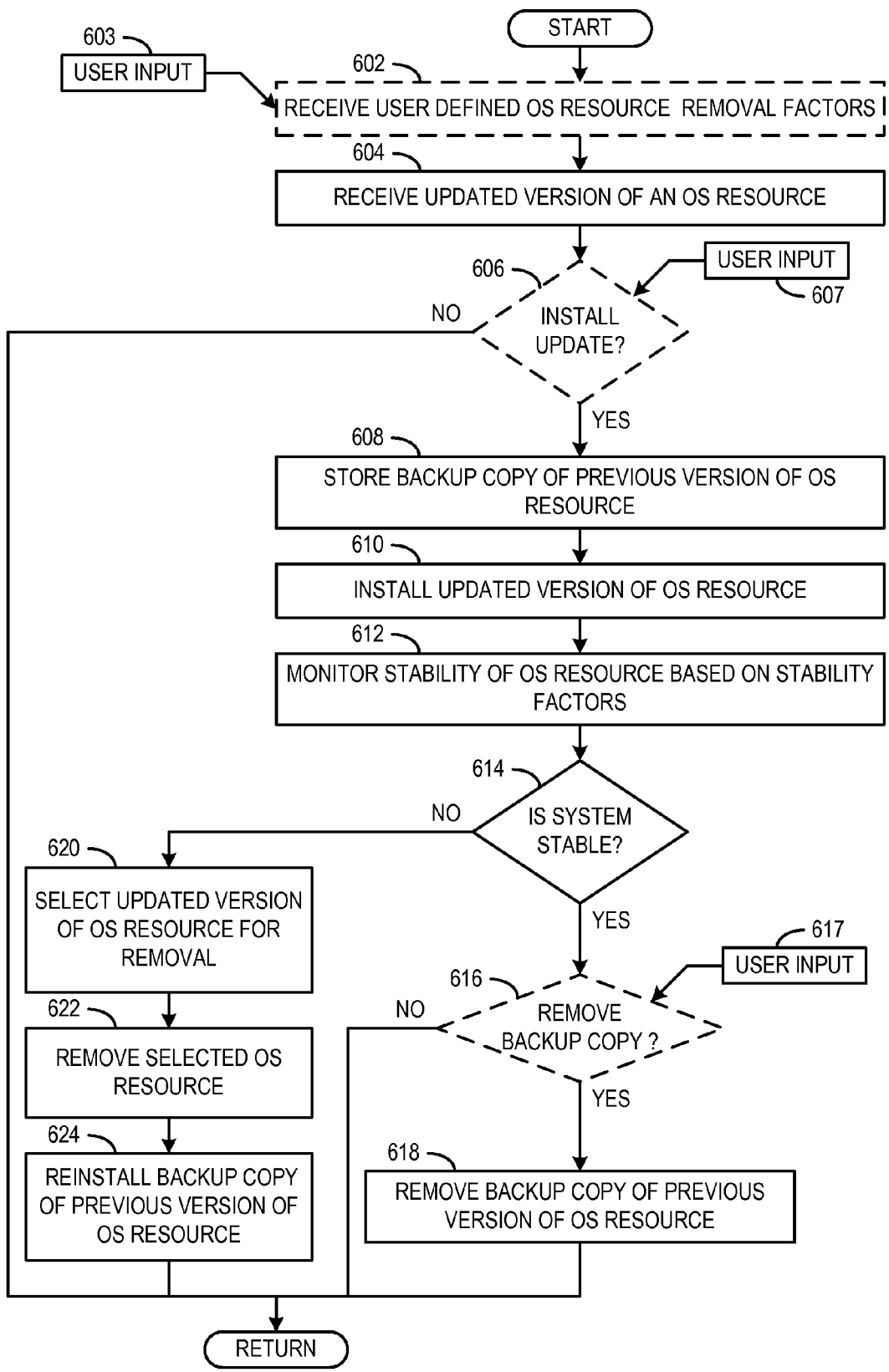
FIG. 6 is a flowchart of another embodiment of a method of dynamically managing operating system resources based on stability of the operating system in response to receiving an updated version of an operating system resource.

FIG. 6 shows a process flow of another example method of dynamically managing operating system resources. The method of FIG. 6 is illustrates one use case scenario in which the method of FIG. 5 may be applied to a particular event. In particular, the method of FIG. 6 is adapted to monitor stability of the operating system based on receiving an updated version of an operating system resource. The method may include, at 602, receiving user defined OS resource removal factors. The user defined OS resource removal factors may be received via user input 603 to the computing system. Alternatively or in addition, in some embodiments, the user defined OS resource removal factors may be predefined by the operating system and/or an OS resource. The OS resource removal factors may include stability factors that may be used to quantify the effect that an OS resource has on the stability of the computing system.

Next at 604, the method may include receiving an updated version of an OS resource.

In some embodiments, the method may include, at 606, querying a user of the computing device to install the updated version of the operating system resource. The user may respond to the query via user input 607. If the user provides input affirming the installation of the updated version of the OS resource, the method continues to 608. Otherwise, if the user provides input that denies installation of the updated version of the OS resource, the method ends, or returns. In some embodiments, the user may not be queried in response to receiving an updated version of an OS resource, and the method may continue directly to 608.

At 608, the method may include storing a backup copy of the previous version of the OS resource. In some examples, the previous version of the OS resource may include the currently installed version of the OS resource that is being updated. In some examples, the previous version of the OS resource may include the original version of the OS resource that is being updated.

Next at 610, the method may include installing the updated version of the OS resource in the operating system of the computing system. Installing the updated version of the OS resource may include saving the updated version of the OS resource in memory of the computing device. In some embodiments, the updated version of the operating system resource may be installed in the operating system in response to receiving an affirmation to an installation query from the user.

Next at 612, the method may include monitoring the effect that the installed updated OS resource has on the stability of the computing system. Monitoring the OS resource may be based one or more stability factors of the operating system. As one example, the stability factor may include a threshold operating system run-time period after installation of the updated version of the OS resource. As another example, the stability factor may include a threshold number of system reboot cycles. As yet another example, a stability factor may include a system performance benchmark.

Next at 614, the method may include determining if the computing system is stable. The determination may be based on meeting the one or more stability factors. If it is determined that the computing system is stable the method proceeds to 616 (or 618). Otherwise, it is determined that the computing system is not stable and the method proceeds to 620.

In some embodiments, the method may include, at 616, querying a user of the computing device to remove the backup copy of the previous version of the OS resource. The user may respond to the query via user input 617. If the user provides input affirming the removal of the backup copy of the previous version of the OS resource, the method continues to 618. Otherwise, if the user provides input that denies removal of the backup copy of the previous version of the OS resource, the backup copy of the previous version of the OS resource is not removed and the method ends. In some embodiments, the user may not be queried in response to receiving an updated version of an OS resource, and the method may continue directly to 618.

At 618, the method may include removing the backup copy of the previous version of the OS resource. In some embodiments, the backup copy of the previous version of the OS resource may be removed from the operating system in response to receiving an affirmation to the query from the user.

Returning to 614, if it is determined that the computer system is not stable the method proceeds to 620. At 620, the method may include selecting the updated version of the OS resource for removal.

Next at 622, the method may include removing the selected updated version of the OS resource. At 624, the method may include reinstalling the backup copy of the previous version of the OS resource. In this manner, the unstable version of the updated resource may be removed and the previously installed stable version of the resource may be reinstalled for use by the user.

The above described method may be used to reduce the processing/memory footprint of the operating system in a robust manner. In particular, the method may consider the stability of the computing system before removing any previous versions of OS resources.

It will be appreciated that the above describe method may be expanded to include monitoring, selecting, and removing different versions of OS resource data elements, as opposed to entire OS resources, without departing from the scope of the present disclosure.

It will be appreciated that the methods described above may be particularly applicable to embedded computing systems or closed computing systems with memory and/or processing constraints because the memory/processing footprint of the operating system may be controlled (e.g., maintained, reduced, minimized, etc.) throughout the lifecycle of the computing system. By reducing the memory/processing footprint of the operating system, the limited memory/processing resources of the embedded computing system may be available to be allocated to other computing operations. In this way, the memory/processing resources of an embedded computing system may be used efficiently to improve the processing capabilities of the embedded computing system.

It will be appreciated that the configurations and/or approaches described herein are exemplary in nature, and that these specific embodiments or examples are not to be considered in a limiting sense, because numerous variations are possible. Furthermore, the specific process flows or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the exemplary embodiments described herein, but are provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for dynamically managing operating system resources of an operating system of a computing device, each of the operating system resources having one or more data elements, the method comprising:
  at an observer module of the operating system of the computing device,
    monitoring one or more of a call stack and currently running processes for the one or more data elements of each of the operating system resources after installation of the one or more data elements on the computing device to monitor stability of the one or more data elements;
    selecting an unstable operating system resource data element; and
    deleting the selected unstable operating system resource data element from the operating system resources.

2. The method of claim 1, further comprising:
  receiving user input that defines a factor of stability of a data element; and
  wherein the selecting of the unstable operating system resource data element is based on the user input defined factor.

3. The method of claim 1, further comprising:
  wherein the selecting of the unstable operating system resource is based on all data elements of the operating system resource being unstable.

4. A computing system, comprising:
  a plurality of operating system resources stored in memory of the computing system, each of the plurality of operating system resources including a data element;
  one or more operating system resource monitoring and removal factors stored in the memory of the computing system; and
  an operating system observer module configured to monitor one or more of a call stack and currently running processes for one or more data elements of each of the plurality of operating system resources after installation of the one or more data elements on the computing system to monitor an effect that the plurality of operating system resources has on stability of the computing system based on the one or more operating system resource monitoring and removal factors, select at least one data element based on a determination of the stability of the computing system after installation of the plurality of operating system resources on the computing system, and remove the selected data element from memory of the computing system.

5. The system of claim 4, wherein the one or more operating system resource monitoring and removal factors includes at least one stability factor, and the selected data element is removed from memory of the computing system based on the at least one stability factor.

6. The system of claim 5, wherein the at least one stability factor of the selected data element includes a threshold operating system run-time period after installation of the data element.

7. The system of claim 5, wherein the at least one stability factor of the selected data element includes a number of operating system reboot cycles after installation of the data element.

8. The system of claim 4, wherein the selected data element is not removed from the memory based on the selected data element being accessed during a predetermined state of operation.

9. The system of claim 8, wherein the predetermined state of operation includes a state during which an operating system performs computing system boot-up operations.

10. The system of claim 4, wherein at least one of the plurality of operating system resources includes a binary file.

11. The system of claim 10, wherein the binary file includes a dynamically linked library.

12. The system of claim 4, wherein the selected data element includes an application programming interface.

13. The method of claim 2, wherein the factor of stability includes a threshold operating system run-time period after installation of the data element.

14. The method of claim 2, wherein the factor of stability includes a number of operating system reboot cycles after installation of the data element.

15. The method of claim 2, wherein the factor of stability includes a system performance benchmark.

16. The computing system of claim 4, wherein the selected data element is included in a backup copy of a previous version of an operating system resource, and the determination is that the computing system is stable for a stability threshold.

17. The computing system of claim 4, wherein the selected data element is selected as being unstable based on the determination that the computing system is not stable for a stability threshold.

18. The system of claim 5, wherein the at least one stability factor of the selected data element includes a system performance benchmark.

\* \* \* \* \*